US010583779B2

United States Patent
Koravadi

(10) Patent No.: US 10,583,779 B2
(45) Date of Patent: Mar. 10, 2020

(54) PARKING ASSIST SYSTEM USING BACKUP CAMERA

(71) Applicant: Magna Electronics Inc., Auburn Hills, MI (US)

(72) Inventor: Krishna Koravadi, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/149,365

(22) Filed: Oct. 2, 2018

(65) Prior Publication Data

US 2019/0100139 A1 Apr. 4, 2019

Related U.S. Application Data

(60) Provisional application No. 62/566,573, filed on Oct. 2, 2017.

(51) Int. Cl.
*B60Q 9/00* (2006.01)
*B60R 1/00* (2006.01)
*B62D 15/02* (2006.01)
*G08G 1/16* (2006.01)

(52) U.S. Cl.
CPC ............ *B60Q 9/002* (2013.01); *B60R 1/00* (2013.01); *B62D 15/027* (2013.01); *B62D 15/028* (2013.01); *G08G 1/168* (2013.01); *B60R 2300/307* (2013.01); *B60R 2300/806* (2013.01)

(58) Field of Classification Search
CPC ..... B60Q 9/002; B60R 1/00; B60R 2300/207; B60R 2300/806; B62D 15/027; B62D 15/028; G08G 1/168
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 6,285,393 B1 * | 9/2001 | Shimoura ............ G05D 1/0246 348/119 |
| 6,636,258 B2 * | 10/2003 | Strumolo .................. B60R 1/00 348/149 |
| 6,690,268 B2 | 2/2004 | Schofield et al. |
| 6,717,610 B1 * | 4/2004 | Bos ......................... B60R 1/00 340/436 |
| 6,882,287 B2 | 4/2005 | Schofield |

(Continued)

*Primary Examiner* — Brian P Yenke
(74) *Attorney, Agent, or Firm* — Honigman LLP

(57) ABSTRACT

A parking assist system for a vehicle includes a rear backup camera and a control having an image processor that processes image data captured by the rear backup camera. The control, when the vehicle is driven forward into a parking slot and responsive to image processing of captured image data, determines a parking slot marker at a side boundary of the parking slot at which the vehicle is being parked. The system may include a display screen that displays images representative of the vehicle at a determined orientation relative to the determined parking slot marker so a driver of the vehicle can determine whether or not the vehicle is aligned in the parking slot. The control may determine a degree of misalignment of the vehicle relative to the parking slot and may generate an output to alert the driver that the vehicle is not aligned in the parking slot.

20 Claims, 3 Drawing Sheets

(56) References Cited

U.S. PATENT DOCUMENTS

| | | | |
|---|---|---|---|
| 7,038,577 B2 | 5/2006 | Pawlicki et al. | |
| 7,161,616 B1* | 1/2007 | Okamoto | B60R 1/00 348/148 |
| 7,308,341 B2 | 12/2007 | Schofield et al. | |
| 7,338,177 B2 | 3/2008 | Lynam | |
| 7,370,983 B2 | 5/2008 | DeWind et al. | |
| 7,592,928 B2* | 9/2009 | Chinomi | B60R 1/00 340/436 |
| 7,598,887 B2* | 10/2009 | Sato | B62D 15/028 340/932.2 |
| 7,720,580 B2 | 5/2010 | Higgins-Luthman | |
| 7,855,755 B2 | 12/2010 | Weller et al. | |
| 8,098,173 B2* | 1/2012 | Hueppauff | B62D 15/028 340/425.5 |
| 8,285,479 B2* | 10/2012 | Kawabata | B60R 1/00 180/204 |
| 8,874,317 B2 | 10/2014 | Marczok et al. | |
| 9,946,940 B2 | 4/2018 | Gupta et al. | |
| 10,078,892 B1* | 9/2018 | Wang | B60C 11/246 |
| 10,106,155 B2* | 10/2018 | Lu | B60R 1/00 |
| 10,214,239 B2* | 2/2019 | Lee | B62D 15/0285 |
| 2006/0050018 A1 | 3/2006 | Hutzel et al. | |
| 2006/0061008 A1 | 3/2006 | Kamer et al. | |
| 2006/0136109 A1* | 6/2006 | Tanaka | B60W 40/04 701/41 |
| 2008/0140286 A1* | 6/2008 | Jung | B62D 15/0285 701/41 |
| 2010/0013670 A1* | 1/2010 | Hueppauff | B62D 15/0275 340/932.2 |
| 2010/0049402 A1* | 2/2010 | Tanaka | B60R 1/00 701/41 |
| 2010/0235053 A1* | 9/2010 | Iwakiri | B62D 15/027 701/42 |
| 2011/0298639 A1* | 12/2011 | Kadowaki | B62D 15/027 340/932.2 |
| 2012/0154591 A1* | 6/2012 | Baur | B60R 1/00 348/148 |
| 2012/0162427 A1 | 6/2012 | Lynam | |
| 2014/0022390 A1 | 1/2014 | Blank et al. | |
| 2014/0160287 A1* | 6/2014 | Chen | G08G 1/168 348/148 |
| 2015/0344028 A1* | 12/2015 | Gieseke | B60R 1/00 701/1 |
| 2016/0325682 A1 | 11/2016 | Gupta et al. | |
| 2017/0015312 A1 | 1/2017 | Latotzki | |
| 2017/0017847 A1 | 1/2017 | Nakaya | |
| 2017/0017848 A1* | 1/2017 | Gupta | B60W 30/06 |
| 2017/0050672 A1 | 2/2017 | Gieseke et al. | |
| 2017/0253237 A1 | 9/2017 | Diessner | |
| 2017/0317748 A1 | 11/2017 | Krapf | |
| 2017/0327037 A1* | 11/2017 | Prakah-Asante | B60R 1/00 |
| 2017/0329346 A1 | 11/2017 | Latotzki | |
| 2018/0022347 A1* | 1/2018 | Myers | G01S 17/023 701/26 |
| 2018/0025234 A1* | 1/2018 | Myers | B60R 1/00 348/148 |
| 2018/0178726 A1* | 6/2018 | Timoneda | B60R 1/086 |
| 2019/0073541 A1 | 3/2019 | Koravadi | |
| 2019/0084618 A1* | 3/2019 | Numata | G06T 7/70 |
| 2019/0111845 A1* | 4/2019 | Karas | B60R 1/00 |
| 2019/0270410 A1* | 9/2019 | Baur | B60R 1/04 |
| 2019/0275941 A1* | 9/2019 | Lu | B60R 1/00 |

* cited by examiner

PARKING ASSIST SYSTEM USING BACKUP CAMERA

CROSS REFERENCE TO RELATED APPLICATION

The present application claims the filing benefits of U.S. provisional application Ser. No. 62/566,573, filed Oct. 2, 2017, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or parking assist system for a vehicle that utilizes one or more cameras (preferably one or more CMOS cameras) to capture image data representative of images exterior of the vehicle, and provides a method and apparatus or system to address parking guidance while parking the vehicle in a forward direction utilizing a single rear camera solution. In accordance with the system, when the vehicle is moving in a forward direction during a parking maneuver and near the end of the parking maneuver, a portion of the lane marking will be visible to and viewable by the rear camera, and utilizing this information the system can estimate or determine the vehicle orientation with respect to the parking slot or determined lines or lane markings and guide the driver to align the vehicle without the driver having to open the door or window of the vehicle to see the lane marking or parking slot marking and align the vehicle in the parking slot.

These and other objects, advantages, purposes and features of the present invention will become apparent upon review of the following specification in conjunction with the drawings.

LEGEND

100—Subject vehicle
102—Rear camera
104—Dash board with display
106—Parking lot lane marking
108—Rear camera detection zone
110—Lane marking visible from the rear camera
112—Direction of motion of the subject vehicle
114—Estimated lane marking utilizing the (110) information
116—ECU that controls the display and alert system in the vehicle
118—Display interface in the vehicle
120—Alert system in the vehicle
122—Lane detection algorithm
124—Lane projection algorithm
126—Misalignment assessment module
128—Driver alert and guidance

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
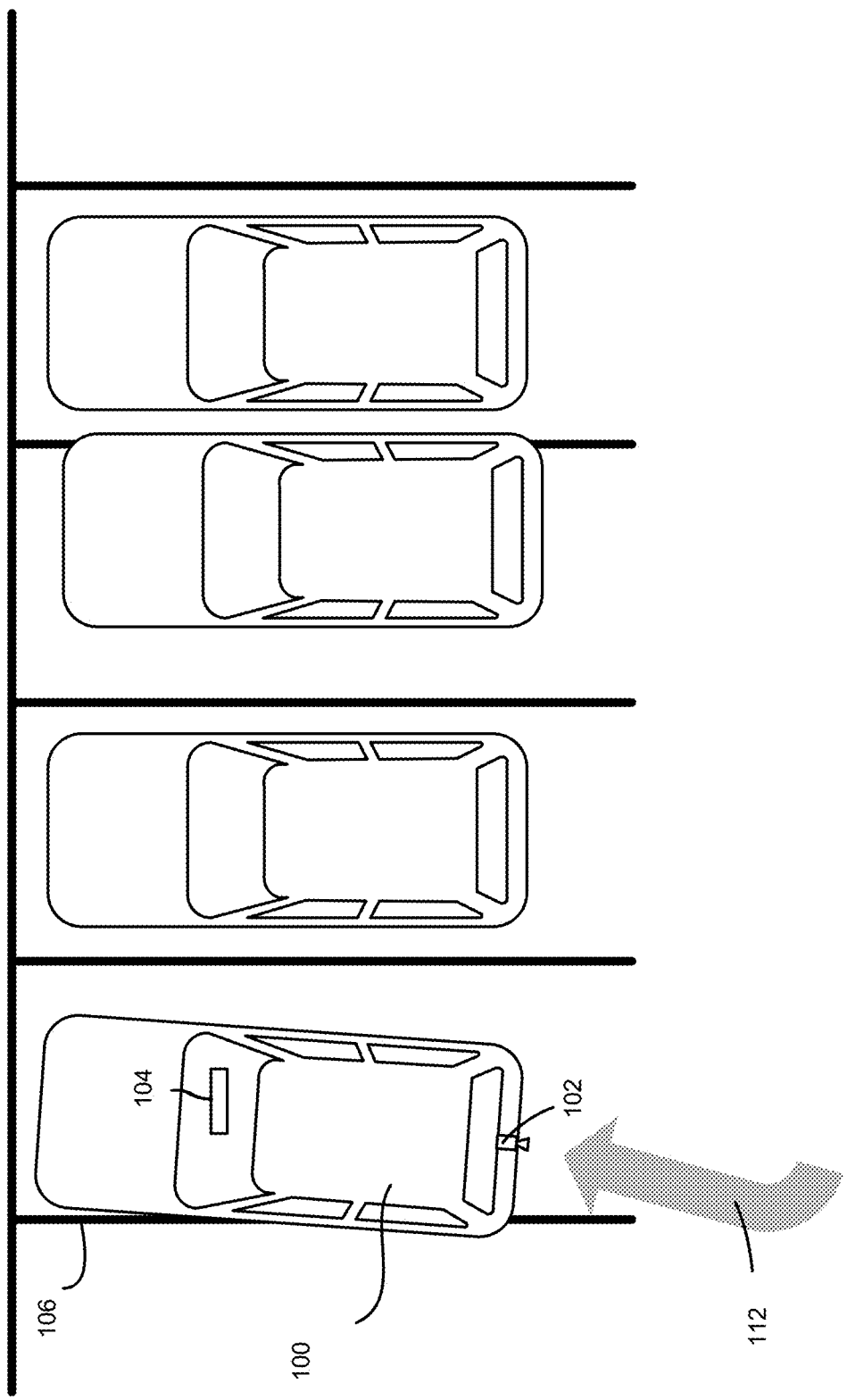
FIG. 1 is a plan view of a vehicle with a vision system that incorporates a rear camera in accordance with the present invention, showing a general misalignment of the vehicle in the parking space.

Referring now to the drawings and the illustrative embodiments depicted therein, a vehicle 100 includes an imaging system or vision system that includes at least a rearward viewing imaging sensor or camera 102 (and the system may optionally include multiple exterior viewing imaging sensors or cameras, such as a forward viewing camera at the front (or at the windshield) of the vehicle, and a sideward/rearward viewing camera at respective sides of the vehicle), which captures image data, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system includes a control or electronic control unit (ECU) or processor that is operable to process image data captured by the camera or cameras and may detect objects or the like and/or provide displayed images at a display device 104 for viewing by the driver of the vehicle (the control and/or the display device may be disposed at any suitable location at or in the vehicle). The data transfer or signal communication from the camera to the ECU may comprise any suitable data or communication link, such as a vehicle network bus or the like of the equipped vehicle.

There are many solutions that exist in the market that overlay virtual lane information over a rear camera image to guide the driver to back up the vehicle efficiently and effectively. This will be helpful when the driver is parking the vehicle in a reverse direction. But most of the cases the driver will be parking the vehicle in the forward direction, and during such forward parking of the vehicle, in many of the cases, the vehicle will not be aligned in between the parking lanes and the driver opens the door and checks for the lane marking and realigns the vehicle. This problem is solved by utilizing the bird eye view by stitching the image data of, for example, four cameras of a surround view system, but this feature is typically only available in high end vehicles. Since rear backup cameras are available in most vehicles, the parking assist solution of the present invention, which utilizes only the single rear camera, is preferred.

FIG. 1 illustrates a plan view of the misalignment of the vehicle 100 in the parking lot when the driver parks the vehicle 100 in the forward direction 112 as the driver cannot see the lane marking 106 at the parking slot or space at which he or she is parking the vehicle.

Figure 2:
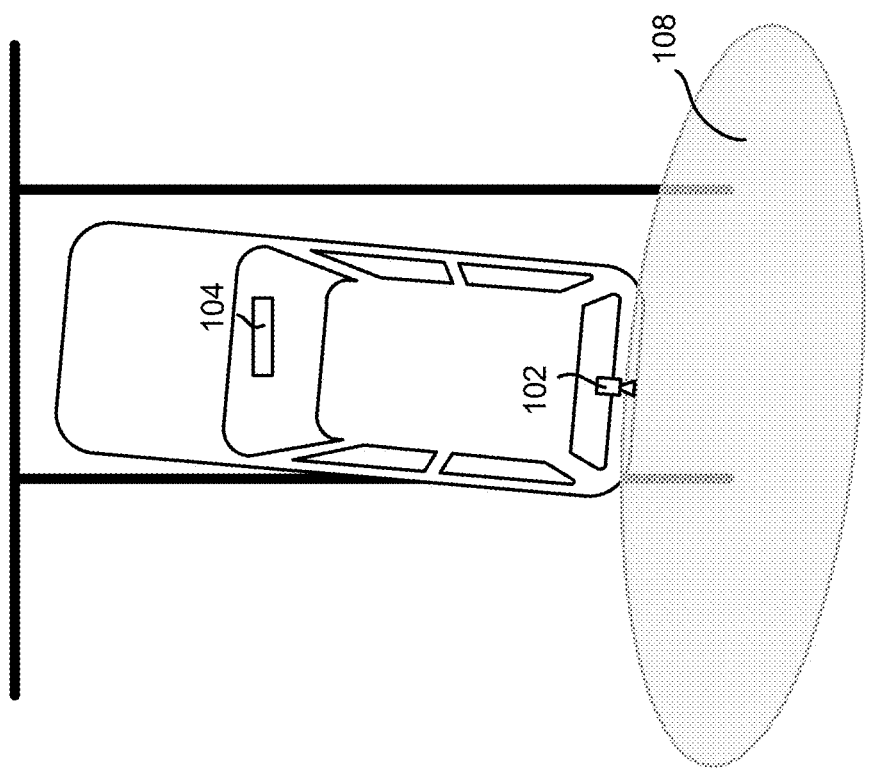
FIG. 2 is a plan view of the vehicle of FIG. 1, showing a typical detection zone or field of view of the rear camera.
Figure 3:
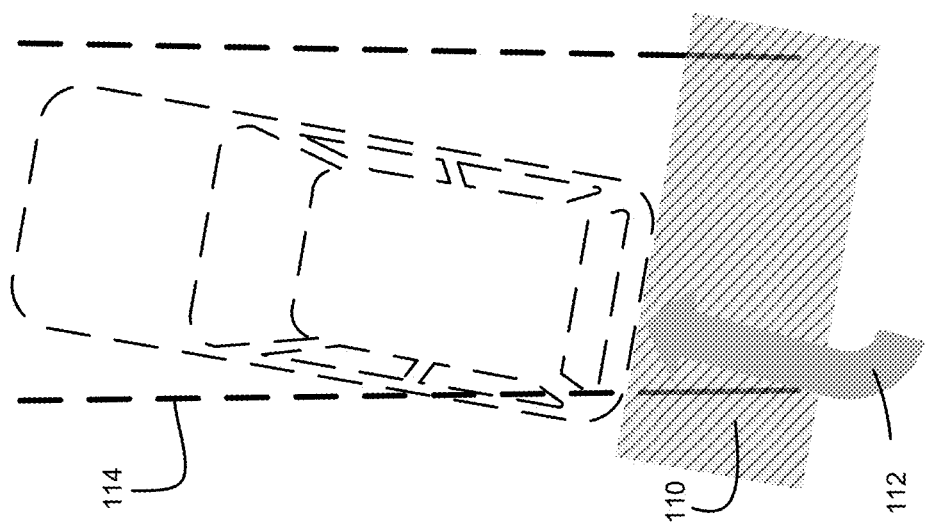
FIG. 3 is another plan view of the vehicle, showing a portion of the parking line that is visible by the rear camera, and showing a projected lane to the front.

FIG. 2 illustrates the detection zone or field of view 108 of the rear camera 102, which is installed at a rear portion of the vehicle 100 and which can detect a portion of the lane marking 110 (see FIG. 3) when traveling in the forward direction 112. Using the portion of the available lane information, the algorithm of the parking assist system can estimate an estimated or projected lane marking 114 which could be used to assist or alert the driver to prevent or limit or mitigate misalignment of the vehicle at the parking slot. The lane marker estimation or projection can be based on detection and determination of a lane marker segment at the rear of the vehicle and an assumption that the lane marker will extend in substantially a straight line forward from that segment.

Figure 4:
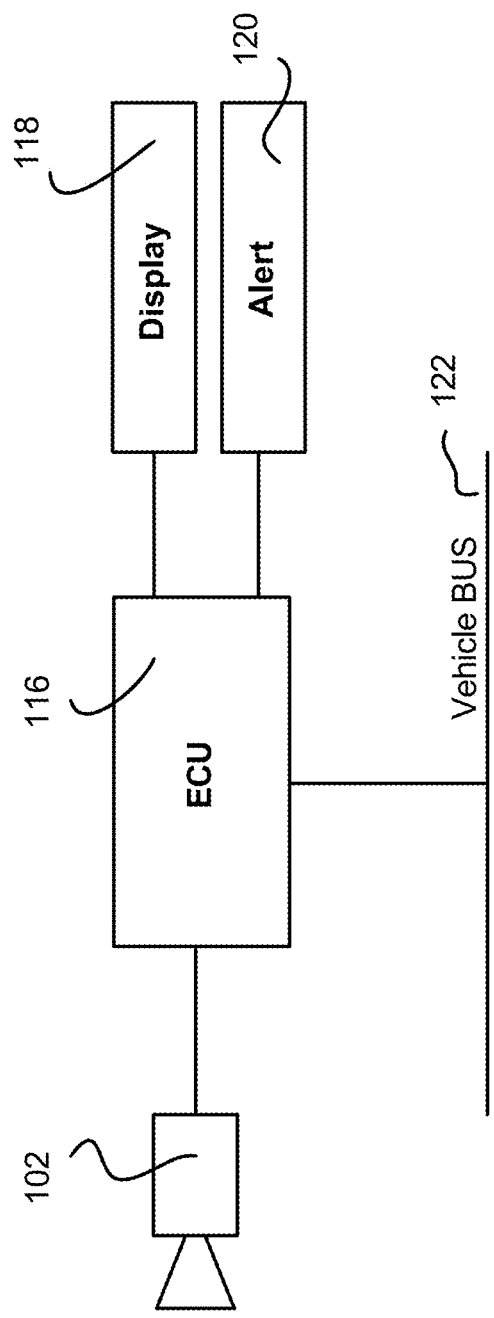
FIG. 4 is a system block diagram of the parking driver assist system of the present invention.

FIG. 4 illustrates a system block diagram of the parking assist system for the vehicle parked facing forward in the parking lot utilizing the rear camera 102. The system comprises the rear camera 102 that detects misalignment and sends the information to the electronic control unit or ECU or controller 116 to display the misalignment on the display screen 118. The system thus displays images that are representative of the equipped vehicle at the determined orientation relative to the determined parking slot marker, so the driver, when viewing the display screen as the equipped vehicle is driven forward into the parking slot, can determine whether or not the equipped vehicle is aligned in the parking slot. For example, the system may display a virtual vehicle or avatar at spaced apart line segments representative of the estimated lane marking 114 so that the driver can correct any misalignment of the vehicle relative to the lane markers of the parking slot. Optionally, the system may provide other displays that would be indicative of the vehicle's alignment or misalignment at the parking slot, such as, for example, iconistic displays or alphanumeric displays that visually alert the driver as to the alignment or misalignment of the vehicle at the parking slot.

Optionally, the ECU may generate an alert 120 to the driver if the vehicle is misaligned more than a threshold amount. For example, the generated alert may comprise an audible alert or a visual alert displayed at the display screen, such as via superimposing or overlaying an alert icon or text at the displayed images (or changing the color of the displayed avatar and/or the displayed line segments from green to red) so the driver readily recognizes that the vehicle is misaligned to a level that should be corrected. The ECU may also be in communication with a vehicle communication network or bus 122, and may communicate with one or more other accessories or systems of the vehicle.

Figure 5:
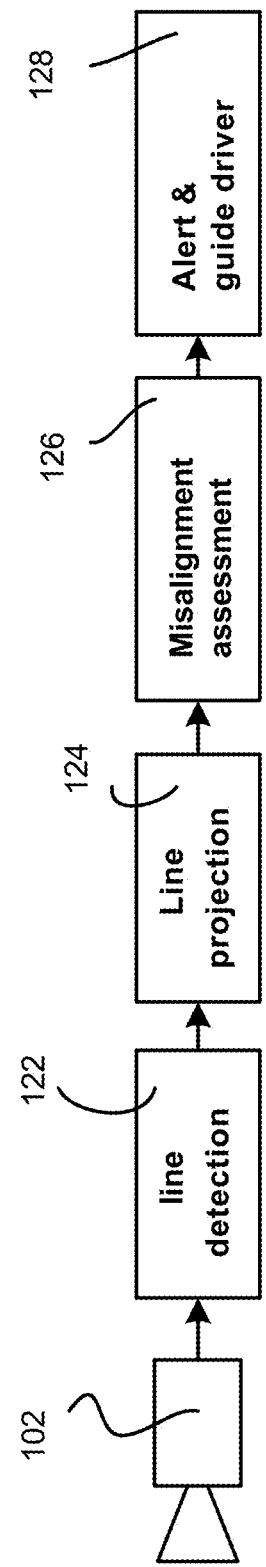
FIG. 5 is a block diagram of the parking driver assist system.

FIG. 5 illustrates a block diagram of the algorithm used by the ECU, which comprises a lane or line detection module 122, which utilizes the image data captured by the camera 102 and detects the portion of the visible lane or line 110 when the vehicle is moving in the forward direction 112 into the parking slot. This detected lane information is used by the lane projection module 124 to estimate the rest of the lane information which is not visible by extending or projecting the lane of the visible lane marking 110. The misalignment assessment module 126 assesses the misalignment of the vehicle with respect to the lane or line and generates an alert and/or visual guidance 128 to the driver so the driver is aware of the determined misalignment and can then correct the misalignment.

Thus, the parking assist system of the present invention uses image data captured only by the rear backup camera to assist a driver in forward parking situations where the vehicle is driven forwardly into a parking space having at least one lane or slot marker along the side of the parking space. Thus, for vehicles that do not have surround view cameras, but do have a rear backup camera, the parking assist system provides assistance for parking the vehicle in forward parking situations. The driver can readily view the displayed information, which may include a top view of a vehicle avatar and the determined and projected line or lines of the parking space, and can readily determine whether or not the vehicle is aligned in the parking space and whether or not the vehicle is too close to one side or the other, and can adjust the position of the vehicle accordingly, without having to look out the window or open the vehicle door and look down to see where the parking space line is. Optionally, the system may determine a degree of misalignment of the vehicle in the parking space and may generate an alert to the driver of the vehicle so the driver is aware of the misalignment and can adjust the position of the vehicle accordingly.

The parking assist system may be actuated via a user input that the driver of the vehicle actuates at the onset or at any time during or even at the end of the parking maneuver, whereby either the display will display the avatar and projected/estimated parking slot line or the system will generate an alert or notification if the vehicle is misaligned (and may generate a confirmation notification that the vehicle is properly parked). Optionally, the parking assist system may automatically activate when the vehicle is driven slowly (below a threshold speed) forward and the system detects a parking space line along one or both sides of the vehicle and determines that the vehicle is in a forward parking maneuver.

Thus, the parking assist system provides a system that can provide an alert or display images so that the driver knows when the vehicle is aligned or m is-aligned as the vehicle is being driven into a parking space or slot. The system utilizes an already existing rear backup camera at the rear of the vehicle to, via image processing of image data captured by the rear backup camera, detect the parking space markers at either or both sides of the parking slot. The system may display images showing an avatar of the vehicle and overlays or representations or images of the parking space markers so that the driver can readily determine the orientation and location of the vehicle in the parking space. The rear backup camera captures image data of the rear or outer end of the parking space markers (FIG. 2), and the display may include overlays or representations of the parking space markers that are extensions of the portions of the markers viewed by the rear backup camera. The displayed images may comprise animated images showing an avatar of a vehicle and overlays or representations of the determined parking space markers, so that the driver readily discerns the orientation or angle of the vehicle relative to the parking space that the vehicle is entering.

The system may utilize aspects of the parking assist systems described in U.S. Pat. No. 8,874,317 and/or U.S. Publication Nos. US-2017-0329346; US-2017-0317748; US-2017-0253237; US-2017-0050672; US-2017-0017847; US-2017-0015312 and/or US-2015-0344028, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties. Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A parking assist system for a vehicle, said parking assist system comprising:

a rear backup camera disposed at a rear portion of a vehicle equipped with said parking assist system and having a field of view at least rearward of the equipped vehicle;

a control comprising a processor that processes image data captured by said rear backup camera;

a display screen disposed in the equipped vehicle and viewable by a driver of the equipped vehicle;

wherein said control, as the equipped vehicle is driven forward into a parking slot and via processing by said processor of only image data captured by said rear backup camera, determines a parking slot marker at a side boundary of the parking slot at which the equipped vehicle is being parked;

wherein said control, as the equipped vehicle is driven forward into the parking slot and via processing by said processor of only image data captured by said rear backup camera, determines an orientation of the equipped vehicle relative to the determined parking slot marker; and wherein, only as the equipped vehicle is driven forward into the parking slot, and responsive to processing by said processor of only image data captured by said rear backup camera, said display screen displays images representative of the equipped vehicle at the determined orientation relative to the displayed determined parking slot marker, so the driver, when viewing the display screen as the equipped vehicle is driven forward into the parking slot, can determine whether or not the equipped vehicle is aligned in the parking slot.

2. The parking assist system of claim 1, wherein said parking assist system is actuated via a user input.

3. The parking assist system of claim 1, wherein, as the equipped vehicle is driven forward into the parking slot, said display screen displays an avatar of a vehicle at spaced apart line segments, with the displayed avatar being at the determined orientation relative to the displayed spaced apart line segments.

4. The parking assist system of claim 1, wherein said control, as the equipped vehicle is driven forward into the parking slot and via processing of image data by said processor of only image data captured by said rear backup camera, determines a rearward portion of the parking slot marker rearward of the equipped vehicle and estimates a forward portion of the determined parking slot marker based at least in part on the determined rearward portion of the parking slot marker.

5. The parking assist system of claim 4, wherein, as the equipped vehicle is driven forward into the parking slot, said display screen displays images representative of the estimated forward portion of the determined parking slot marker to assist in displaying misalignment of the equipped vehicle relative to the determined parking slot marker.

6. The parking assist system of claim 5, wherein said display screen displays images that include images of the determined rearward portion of the parking slot marker rearward of the equipped vehicle as derived from image data captured by said rear backup camera.

7. The parking assist system of claim 1, wherein said control, as the equipped vehicle is driven forward into the parking slot and responsive to determination of the parking slot marker, determines a degree of misalignment of the equipped vehicle relative to the parking slot, and wherein said control, as the equipped vehicle is driven forward into the parking slot and responsive to the determined degree of misalignment being greater than a threshold degree of misalignment, generates an output to alert the driver that the equipped vehicle is not aligned in the parking slot.

8. The parking assist system of claim 1, wherein said control, as the equipped vehicle is driven forward into the parking slot and responsive to processing by said processor of only image data captured by said rear backup camera, determines a parking slot marker at each side boundary of the parking slot at which the equipped vehicle is being parked, and wherein, as the equipped vehicle is driven forward into the parking slot, said display screen displays images representative of each of the determined parking slot markers.

9. A parking assist system for a vehicle, said parking assist system comprising:

a rear backup camera disposed at a rear portion of a vehicle equipped with said parking assist system and having a field of view at least rearward of the equipped vehicle;

a control comprising a processor operable to process image data captured by said rear backup camera;

wherein said control, only as the equipped vehicle is driven forward into a parking slot and via processing by said processor of only image data captured by said rear backup camera, determines a parking slot marker at a side boundary of the parking slot at which the equipped vehicle is being parked;

wherein said control, as the equipped vehicle is driven forward into the parking slot and via processing by said processor of only image data captured by said rear backup camera, determines a degree of misalignment of the equipped vehicle relative to the determined parking slot marker; and wherein said control, as the equipped vehicle is driven forward into the parking slot and responsive to the determined degree of misalignment being greater than a threshold degree of misalignment, generates an output to alert a driver of the equipped vehicle that the equipped vehicle is not aligned in the parking slot.

10. The parking assist system of claim 9, wherein said parking assist system is actuated via a user input.

11. The parking assist system of claim 9, comprising a display screen that is viewable by the driver of the equipped vehicle, wherein the output comprises display at said display screen of images representative of the equipped vehicle at an orientation relative to the displayed determined parking slot marker.

12. The parking assist system of claim 11, wherein said control, as the equipped vehicle is driven forward into the parking slot and via processing of image data by said processor of only image data captured by said rear backup camera, determines a rearward portion of the parking slot marker rearward of the equipped vehicle and estimates a forward portion of the determined parking slot marker based at least in part on the determined rearward portion of the parking slot marker.

13. The parking assist system of claim 9, wherein the output comprises an audible alert.

14. The parking assist system of claim 9, wherein, as the equipped vehicle is driven forward into the parking slot and responsive to the determined degree of misalignment being less than the threshold degree of misalignment, said control generates another output to notify the driver that the equipped vehicle is aligned in the parking slot.

15. A parking assist system for a vehicle, said parking assist system comprising:

a rear backup camera disposed at a rear portion of a vehicle equipped with said parking assist system and having a field of view at least rearward of the equipped vehicle;

a control comprising a processor operable to process image data captured by said rear backup camera;

a display screen disposed in the equipped vehicle and viewable by a driver of the equipped vehicle;

wherein said control, as the equipped vehicle is driven forward into a parking slot and via processing by said processor of only image data captured by said rear backup camera, determines a parking slot marker at each side boundary of the parking slot at which the equipped vehicle is being parked;

wherein said control, as the equipped vehicle is driven forward into the parking slot and via processing by said processor of only image data captured by said rear backup camera, determines an orientation of the equipped vehicle relative to the determined parking slot markers;

wherein, only as the equipped vehicle is driven forward into the parking slot, and responsive to processing by said processor of only image data captured by said rear backup camera, said display screen displays an avatar of a vehicle at the displayed spaced apart line segments, and wherein the displayed avatar is at the determined orientation relative to the displayed spaced apart line segments so the driver, when viewing the display screen as the equipped vehicle is driven forward into the parking slot, can determine whether or not the equipped vehicle is aligned in the parking slot;

wherein said control, as the equipped vehicle is driven forward into the parking slot and via processing by said processor of only image data captured by said rear backup camera, determines when the determined orientation is indicative of a threshold degree of misalignment of the equipped vehicle relative to the determined parking slot markers; and wherein said control, as the equipped vehicle is driven forward into the parking slot and responsive to the determined orientation being indicative of greater than the threshold degree of misalignment, generates an alert to the driver of the equipped vehicle.

16. The parking assist system of claim 15, wherein said parking assist system is actuated via a user input.

17. The parking assist system of claim 15, wherein said control, as the equipped vehicle is driven forward into the parking slot and via processing of image data by said processor of only image data captured by said rear backup camera, determines a rearward portion of the parking slot marker rearward of the equipped vehicle and estimates a forward portion of the determined parking slot marker based at least in part on the determined rearward portion of the parking slot marker.

18. The parking assist system of claim 15, wherein the alert comprises an audible alert.

19. The parking assist system of claim 15, wherein the alert comprises a visual alert displayed at said display screen.

20. The parking assist system of claim 15, wherein, as the equipped vehicle is driven forward into the parking slot and responsive to the determined degree of misalignment being less than the threshold degree of misalignment, said control generates an output to notify the driver that the equipped vehicle is aligned in the parking slot.

* * * * *

UNITED STATES PATENT AND TRADEMARK OFFICE
CERTIFICATE OF CORRECTION

PATENT NO. : 10,583,779 B2
APPLICATION NO. : 16/149365
DATED : March 10, 2020
INVENTOR(S) : Krishna Koravadi Page 1 of 1

It is certified that error appears in the above-identified patent and that said Letters Patent is hereby corrected as shown below:

In the Specification

<u>Column 4</u>
Line 47, "m is-aligned" should be --mis-aligned--

Signed and Sealed this
Seventh Day of April, 2020

Andrei Iancu
*Director of the United States Patent and Trademark Office*